(12) United States Patent
Zhang

(10) Patent No.: US 9,068,663 B2
(45) Date of Patent: Jun. 30, 2015

(54) ELECTROMAGNETIC LINEAR VALVE

(75) Inventor: Kunlin Zhang, Xiamen (CN)

(73) Assignee: XIAMEN KOGE MICRO TECH CO., LTD., Xiamen (CN)

( * ) Notice: Subject to any disclaimer, the term of this patent is extended or adjusted under 35 U.S.C. 154(b) by 681 days.

(21) Appl. No.: 13/202,481

(22) PCT Filed: Feb. 9, 2010

(86) PCT No.: PCT/CN2010/070587
§ 371 (c)(1),
(2), (4) Date: Aug. 19, 2011

(87) PCT Pub. No.: WO2010/094231
PCT Pub. Date: Aug. 26, 2010

(65) Prior Publication Data
US 2012/0001108 A1    Jan. 5, 2012

(30) Foreign Application Priority Data
Feb. 20, 2009  (CN) .......................... 2009 2 0136832

(51) Int. Cl.
*F16K 31/02*  (2006.01)
*F16K 27/10*  (2006.01)
*F16K 31/06*  (2006.01)

(52) U.S. Cl.
CPC ........... *F16K 27/102* (2013.01); *F16K 31/0655* (2013.01)

(58) Field of Classification Search
CPC .................................................... F16K 27/102
USPC .............. 251/129.2, 129.22, 129.15; 137/605
See application file for complete search history.

(56) References Cited

U.S. PATENT DOCUMENTS

| 4,986,246 | A * | 1/1991 | Kessler de Vivie et al. .. 123/520 |
| 5,161,779 | A * | 11/1992 | Graner et al. ............ 251/129.16 |
| 6,149,126 | A * | 11/2000 | Krimmer et al. ............. 251/118 |
| 6,457,484 | B1 * | 10/2002 | Najmolhoda ............... 137/15.18 |
| 6,598,852 | B2 * | 7/2003 | Tomoda et al. ........... 251/129.19 |
| 7,264,230 | B2 * | 9/2007 | Burns et al. ..................... 261/47 |
| 2002/0145125 | A1* | 10/2002 | Tomoda et al. .......... 251/129.15 |
| 2003/0038262 | A1* | 2/2003 | Shost ....................... 251/129.18 |
| 2005/0245789 | A1* | 11/2005 | Smith et al. .................... 600/159 |
| 2007/0001135 | A1* | 1/2007 | Asai et al. ........................ 251/65 |

(Continued)

FOREIGN PATENT DOCUMENTS

| CN | 2554427 Y | 6/2003 |
| CN | 2599333 Y | 1/2004 |
| CN | 201363474 Y | 12/2009 |
| JP | 2000-352473 A | 12/2000 |

(Continued)

*Primary Examiner* — John K Fristoe, Jr.
*Assistant Examiner* — Christopher Ballman
(74) *Attorney, Agent, or Firm* — Rabin & Berdo, P.C.

(57) ABSTRACT

Provided is an electromagnetic linear valve that includes a main valve body having an upper valve body and a lower valve body. The upper valve body and the lower valve body are connected together by ultrasonic welding. The lower valve body comprises a frame. The electromagnetic linear valve includes a spring leaf and a movable element. An electromagnetic unit drives the movable element in the valve body, and the electromagnetic unit includes a steel casing that is fixed to the frame. A baffle divides the valve body into upper and lower valve chambers. The upper valve chamber has an inlet vent and an outlet vent. A through hole is formed in the baffle to connect the upper and lower valve chambers. The movable element has a valve plug blocking the through hole on the baffle.

13 Claims, 2 Drawing Sheets

(56) References Cited

U.S. PATENT DOCUMENTS

2008/0251747 A1* 10/2008 Cobianchi et al. ....... 251/129.15
2009/0039302 A1* 2/2009 Giacomini et al. ...... 251/129.15

FOREIGN PATENT DOCUMENTS

| JP | 2003-126051 A | 5/2003 |
| JP | 2003-140753 A | 5/2003 |

* cited by examiner

ELECTROMAGNETIC LINEAR VALVE

FIELD OF THE INVENTION

The present invention relates to an electromagnetic linear valve that controls the switching of gas, more particularly to an electromagnetic linear valve with improved structure.

BACKGROUND OF THE INVENTION

The electromagnetic linear valve is widely used to control the switching of gas in the pipeline, and it mainly comprises a valve body, a movable element, an electromagnetic unit and a spring leaf. The valve body is divided into two valve chambers by a baffle having a through hole connecting the two valve chambers, and two valve chambers have an air inlet vent and an exhaust vent, and the movable element has a valve plug blocking the through hole on the baffle; the electromagnetic unit works together with the spring leaf to move the movable element and the valve plug and to make the valve plug switch between plugging the through hole and leaving the through hole.

The main defects of the existing electromagnetic linear valve are: first of all, the two parts of the valve body are closured by bolts, being uneasy to assemble, and the movement of the bolts is easy to generate mismatch error or to damage related components; secondly, there is no support device for the coil of the electromagnetic unit so that it is not easy to coil up the coil and the structure is unstable; thirdly, the controller board of the electromagnetic unit is set beside the coil so that the volume of the valve body is big.

SUMMARY OF THE INVENTION

The object of the present invention is to offer an electromagnetic linear valve with improved structure which can overcome the defects of the prior art, such as the irrationality of the connection of the two valve parts, the irrationality of the assembly structure of the coil, and the irrationality of the position of the controller board.

The technical scheme is mentioned as follows:

An electromagnetic linear valve with improved structure comprises a valve body, a movable element, an electromagnetic unit driving the movable element in the valve body and a spring leaf, wherein said valve body is divided into two valve chambers by a baffle where a through hole is formed to make the two valve chambers connected, and two valve chambers have an air inlet vent and an exhaust vent respectively, and the movable element has a valve plug blocking the through hole on the baffle, and the valve body comprises a upper valve body and a lower valve body, wherein said upper valve body and lower valve body are connected by ultrasonic welding.

The electromagnetic linear valve with improved structure, wherein said upper valve body has concave pillars, and the through holes that match with the concave pillars are set in the lower valve body, the bottoms of the concave pillars and of the through holes are merged by ultrasonic welding.

Each of the abutted surfaces belonging to the upper valve body and to the lower valve body has stair-stepping face interacting with each other.

The electromagnetic linear valve with improved structure, wherein said electromagnetic unit comprises a coil, a controller board connecting with the coil, a iron core, a magnet and a steel casing, the steel casing opens upward and its bottom surface is fix on the upward side of the bottom surface belonging to the lower valve body, the magnet is fix on the upward side of the bottom surface belonging to the steel casing, the iron core is fix on the upward side of the magnet, the valve plug facing to the through hole of the baffle is fix to the top of the movable element, the spring leaf is connected between the movable element and the valve body; the movable element has a corbelled trunk bulkhead enclosing the movable iron core and the coil enwinds the corbelled trunk bulkhead.

The controller board is set on the bottom of the steel casing, the lower valve body has wire casing through which the connecting line between the controller board and the coil are set.

According to the description of the present invention, the beneficial effects from the technical scheme compared with the prior art are: firstly, the upper valve body and the lower valve of the present invention are connected by ultrasonic welding so that the connection is tight, stable and long working, and the damage of other components caused by rotating a bolt in the assembling process is avoided; secondly, the coil of the electromagnetic unit enwinds the corbelled trunk bulkhead so that it can coil up the coil around the corbelled trunk bulkhead instead of coiling up the coil in advance, so that the structure of the coil is more stable; thirdly, the controller board is set beneath the steel casing so that the integral structure of the electromagnetic linear valve is more compact and smaller.

DESCRIPTION OF THE PREFERRED EMBODIMENTS

With the following description of the drawings, the specific embodiment of the present invention shall be further described in details.

Figure 1:
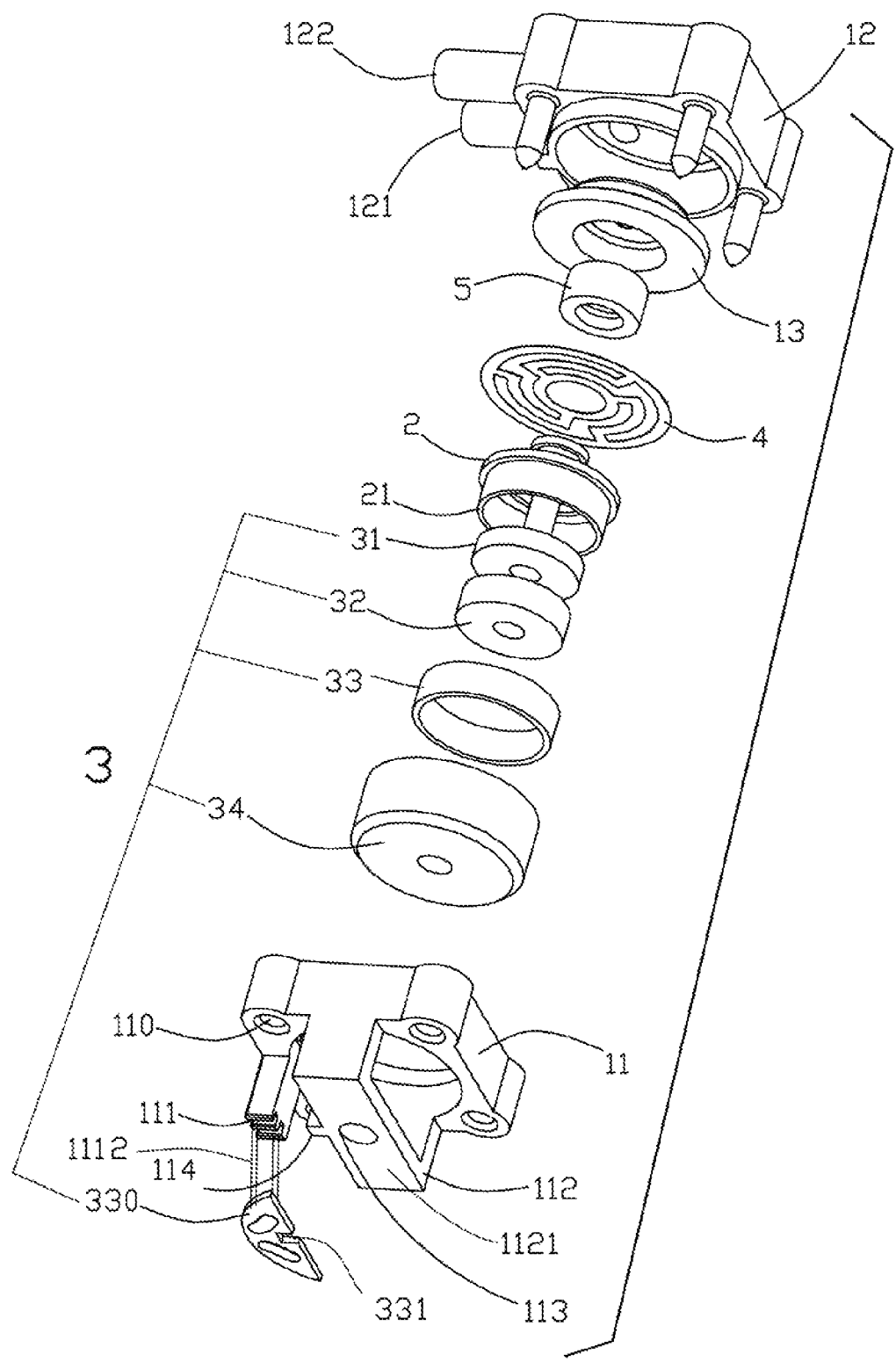
FIG. 1 shows an exploded view according to the present invention.
Figure 2:
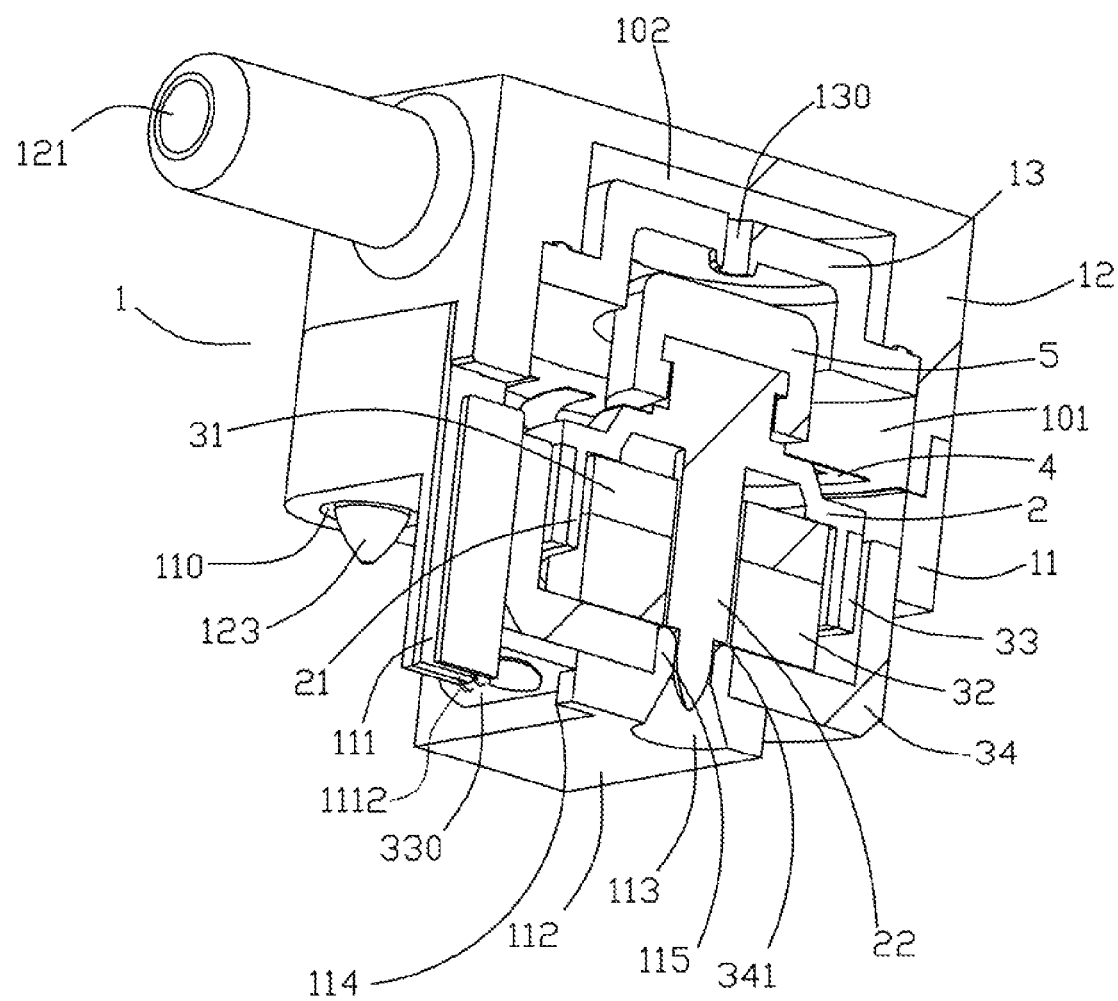
FIG. 2 shows a sectional view according to the present invention.

In FIG. 1 and FIG. 2, the electromagnetic linear valve of the present embodiments comprises a valve body 1 (which may also be referred to a as a "main valve body"), a movable element 2, an electromagnetic unit 3 driving the movable element 2 in the valve body 1 and a spring leaf 4.

The valve body 1 comprises a lower valve body 11 and a upper valve body 12, and each of the four corners of the upper valve body's 12 bottom surface has a concave pillar 123 projecting downward, and each of the four corners of the lower valve body 11 has a through hole 110 interacting with the concave pillar 123; the bottoms of the concave pillars 123 and of the through holes 110 are merged by ultrasonic welding, and each of the abutted surface belonging to the upper valve body 12 and the lower valve body 11 has stair-stepping face interacting with each other for position fixing.

The valve body 1 is divided into a lower valve chamber 101 and an upper valve chamber 102 by a baffle 13 in the upper valve body 12. A through hole 130 is formed on the baffle 13 to make the lower valve chambers 101 and the upper valve chambers 102 connected, and the upper valve chamber 102 has air inlet vent 121 and exhaust vent 122.

A frame 112 extends downward from the center of bounding rectangle belonging to the lower valve body 11, a fixing hole 113 is formed in the center of the bottom plate 1121 belonging to the frame 112, and the bottom plate has a projecting part 114 on one side of its center.

The electromagnetic unit 3 comprises a coil 33, a controller board 330 connecting with the coil 33, an iron core 31, a magnet 32 and a steel casing 34. The controller board 330 is set on the bottom of the steel casing 34, and the lower valve body 11 has a wire casing 111 through which the connecting line 1112 between the controller board 330 and the coil 33 are set. The shape of the controller board 330 is hemicycle matching to the bottom surface of the steel casing 34, the controller board 330 has a groove 331 interacting with the projecting part 114 belonging to the bottom surface of the lower valve body 11 for position fixing.

The steel casing 34 opens upward and its bottom surface is fixed to the frame 112 of the lower valve body 11. The magnet 32 is fix on the upward side of the bottom surface belonging to the steel casing 34, the iron core 31 is fix on the upward side of the magnet 32, the valve plug 5 facing to the through hole 130 of the baffle 13 is fix to the top of the movable element 2, the spring leaf 4 is connected between the movable element 2 and the valve body 1. The movable element 2 has a corbelled trunk bulkhead 21 enclosing the iron core 31 and the coil 33 enwinds the corbelled trunk bulkhead 21; the axis rod 22 that is at the lower end of the movable element 2 threads the iron core 31, the magnet 32 and then the fixing hole 113 of the frame 112 for position fixing; a positioning tube 115 extends upward from the fixing hole 113, of which the outer diameter is identical to the diameter of the fixing hole 341 belonging to the steel casing 34 and the inner diameter is identical to the diameter of the top of the axis rod 22.

The steel casing 34 is fixed to the frame 112 of the lower valve body 11 so that it has good heat dispersion. As an example, a working process may occur as follows. A high speed gas flows through the inlet vent 121 of the upper valve chamber 102 and goes into upper valve chamber 102. Since the bore diameter of the inlet vent 121 may be smaller than the volume of upper valve chamber 102, the speed of gas is slowed down when the gas goes into upper valve chamber 121. Then the gas passes through the outlet vent (i.e., the exhaust vent) 122. This process may reduce noise.

The invention has been described with reference to the specific embodiment mentioned above; therefore it cannot limit the reference implementation of the invention, it is obvious to a person skilled in the art that structural modification and changes can be carried out without leaving the scope of the claims hereinafter and the description above.

INDUSTRIAL APPLICABILITY

The present invention discloses an electromagnetic linear valve with improved structure. Its upper valve body and lower valve body are connected by ultrasonic welding so that the connection is tight, stable and long working, and the damage of other components caused by rotating a bolt in the assembling process is avoided, reducing working hours and diminishing costs.

What is claimed is:

1. An electromagnetic linear valve comprising:
a main valve body having an upper valve body and a lower valve body, said upper valve body and said lower valve body being connected together by ultrasonic welding, and the lower valve body comprises a frame, said main valve body being divided into an upper valve chamber and a lower valve chamber, the upper valve chamber having an inlet vent and an outlet vent, that are each directly connected to an outside of the electromagnetic linear valve;
a movable element;
a spring leaf;
an electromagnetic unit which drives the movable element in the main valve body, the electromagnetic unit including a steel casing that is fixed to the frame; and
a baffle dividing said main valve body into the upper and lower valve chambers, a through hole being formed in the baffle to connect the upper and lower valve chambers, and
the movable element having a valve plug blocking the through hole on the baffle.

2. The electromagnetic linear valve according to claim 1, wherein said upper valve body has pillars, and through holes that match with said pillars are set in said lower valve body, a bottom of said pillars and a bottom of the through holes set in said lower valve body are merged by ultrasonic welding.

3. The electromagnetic linear valve according to claim 2, wherein said upper valve body has an abutted surface that is a stair-stepping face that interacts with an abutted surface of said lower valve body that is a stair-stepping face.

4. The electromagnetic linear valve according to claim 1, wherein said electromagnetic unit includes
a coil,
a controller board connecting with the coil,
an iron core,
a magnet, and
the steel casing opens upward and has a bottom surface that is fixed on an upward side of a bottom surface belonging to said lower valve body,
said magnet is fixed on an upward side of the bottom surface of said steel casing,
said iron core is fixed on an upward side of said magnet,
said valve plug is fixed to a top of said movable element,
said spring leaf is connected between said movable element and said main valve body;
said movable element has a corbelled trunk bulkhead enclosing said iron core and said coil enwinds the corbelled trunk bulkhead.

5. The electromagnetic linear valve according to claim 4, further comprising a connecting line between said controller board and said coil, wherein
said controller board is set on a bottom of said steel casing, and
said lower valve body has wire casing through which the connecting line is set.

6. The electromagnetic linear valve according to claim 4, wherein the frame has a projecting part on a bottom surface of the lower valve body,
wherein a shape of said controller board is hemicycle matching to the bottom surface of said steel casing;
said controller board has a groove interacting with the projecting part for position fixing.

7. The electromagnetic linear valve according to claim 1, wherein the frame extends downward from a center of a bounding rectangle of said lower valve body, a fixing hole being formed in a center of a bottom plate of said frame, and said bottom plate has a projecting part on one side of the center of the bottom plate.

8. The electromagnetic linear valve according to claim 7, wherein said steel casing opens upward and a bottom surface of the steel casing is fixed to the frame of said lower valve body.

9. The electromagnetic linear valve according to claim 7, said steel casing opens upward and has a bottom surface fixed to the frame of said lower valve body.

10. The electromagnetic linear valve according to claim 7, further comprising a controller board,
wherein a shape of said controller board is hemicycle matching to a bottom surface of said steel casing, controller board has a groove interacting with the projecting part for position fixing.

11. The electromagnetic linear valve according to claim 1, wherein a bore diameter of the inlet vent is smaller than a volume of the upper valve chamber so that a speed of gas passing through the inlet vent is slowed when the gas goes into upper valve chamber.

12. An electromagnetic linear valve comprising:
a main valve body having an upper valve body and a lower valve body, said upper valve body and said lower valve body being connected together by ultrasonic welding, said main valve body being divided into an upper valve chamber and a lower valve chamber, the upper valve chamber having an inlet vent and an outlet vent;
a movable element;
a spring leaf;
an electromagnetic unit which drives the movable element in the main valve body; and
a baffle dividing said main valve body into the upper and lower valve chambers, a through hole being formed in the baffle to connect the upper and lower valve chambers, and
the movable element having a valve plug blocking the through hole on the baffle,
wherein said electromagnetic unit includes
a coil,
a controller board connecting with the coil,
an iron core,
a magnet, and
the steel casing opens upward and has a bottom surface that is fixed on an upward side of a bottom surface belonging to said lower valve body,
said magnet is fixed on an upward side of the bottom surface of said steel casing,
said iron core is fixed on an upward side of said magnet,
said valve plug is fixed to a top of said movable element,
said spring leaf is connected between said movable element and said main valve body;
said movable element has a corbelled trunk bulkhead enclosing said iron core and said coil enwinds the corbelled trunk bulkhead,
wherein said movable element has an axis rod that is at a lower end of said movable element and that threads the iron core, the magnet and then a fixing hole of the frame for position fixing,
the electromagnetic linear valve further comprising a positioning tube extending upward from the fixing hole, the positioning tube having an outer diameter that is identical to a diameter of a fixing hole in the steel casing and an inner diameter of the positioning tube is identical to a diameter of an end of the axis rod.

13. An electromagnetic linear valve comprising:
a main valve body having an upper valve body and a lower valve body, said upper valve body and said lower valve body being connected together by ultrasonic welding, said main valve body being divided into an upper valve chamber and a lower valve chamber, the upper valve chamber having an inlet vent and an outlet vent;
a movable element;
a spring leaf;
an electromagnetic unit which drives the movable element in the main valve body, the electromagnetic unit including a steel casing;
a baffle dividing said main valve body into the upper and lower valve chambers, a through hole being formed in the baffle to connect the upper and lower valve chambers, and
the movable element having a valve plug blocking the through hole on the baffle,
an iron core; and
a magnet, and
the lower valve body comprises a frame, the frame extends downward from a center of a bounding rectangle of said lower valve body, a fixing hole being formed in a center of a bottom plate of said frame, and said bottom plate has a projecting part on one side of the center of the bottom plate,
wherein an axis is at a lower end of said movable element and threads the iron core, the magnet and then the fixing hole of the frame for position fixing;
the electromagnetic linear valve further comprising a positioning tube extends upward from the fixing hole, the positioning tube having an outer diameter identical to a diameter of a fixing hole in the steel casing and an inner diameter of the positioning tube is identical to a diameter of the end of the axis rod.

* * * * *